Dec. 3, 1968  S. G. WINGQUIST  3,413,890
METHOD OF AND A DEVICE FOR MACHINING BLANKS
Filed Feb. 9, 1966  4 Sheets-Sheet 1

INVENTOR
STEN GUNNAR WINGQUIST
BY
ATTORNEYS

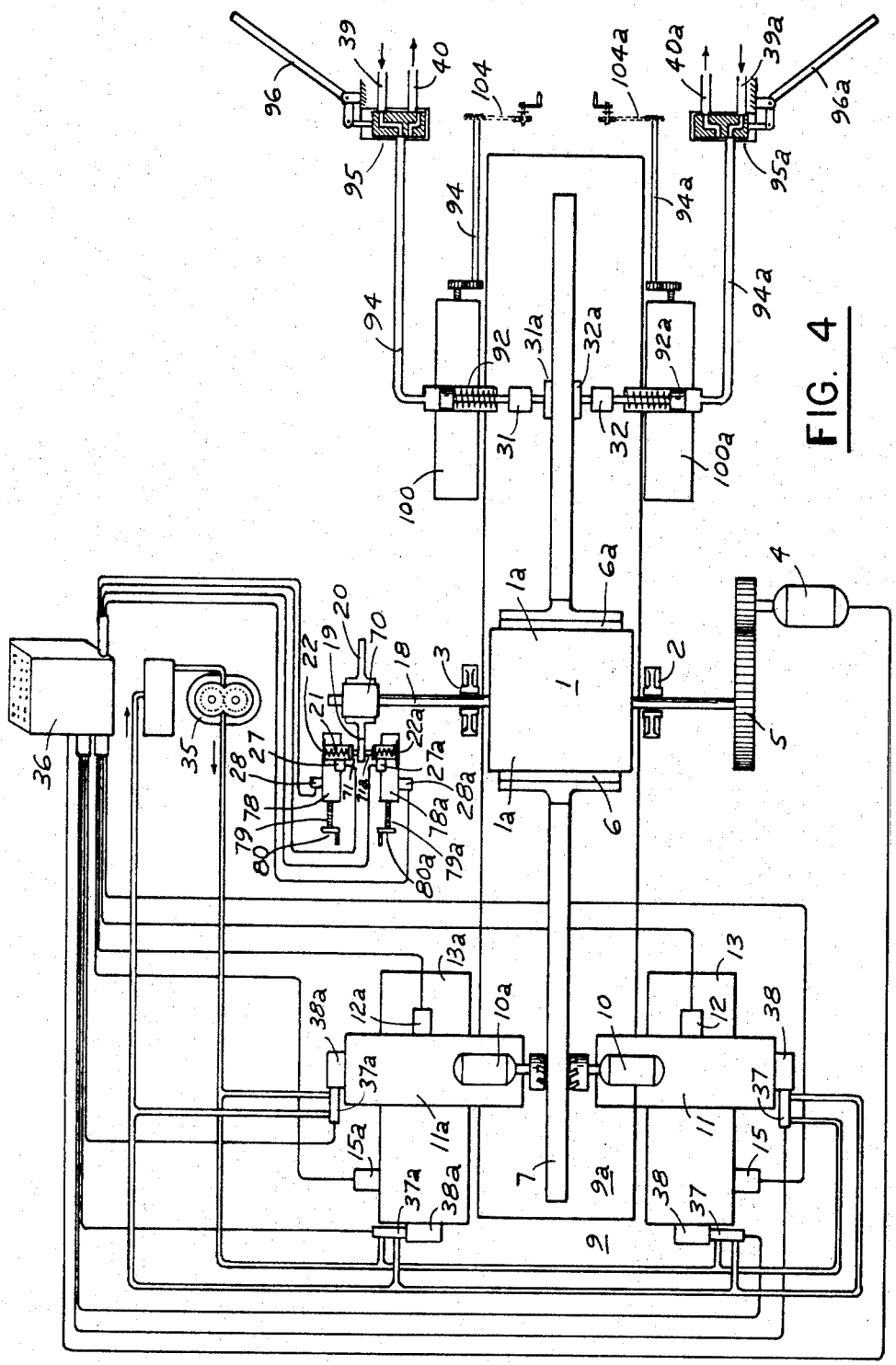

United States Patent Office 3,413,890
Patented Dec. 3, 1968

3,413,890
METHOD OF AND A DEVICE FOR MACHINING BLANKS
Sten Gunnar Wingquist, Trollhattan, Sweden, assignor to Nydqvist & Holm Aktiebolag, Trollhattan, Sweden, a corporation of Sweden
Continuation-in-part of application Ser. No. 342,568, Feb. 4, 1964. This application Feb. 9, 1966, Ser. No. 526,118
5 Claims. (Cl. 90—13)

ABSTRACT OF THE DISCLOSURE

There is a disclosed a copying machine for machining blanks in continuous operation in conformity with and under the control of master patterns. The machine comprises a first rotary shaft on which a pair of blanks can be mounted in circumferentially spaced relationship. A first machining means serves to machine the blanks when in a first predetermined angular position, and a second machining means serves to machine the blanks when in a second predetermined angular position. A second rotary shaft mounts a pair of master patterns in a circumferentially spaced relationship corresponding to the angular spacing of the blanks as mounted on the first shaft. One master pattern controls the machining by the first machining means and the other master pattern by the second machining means. Control means control the master patterns and the machining means so that a blank is machined by the first machining means when it is in the first angular position and by the second machining means when it is the second angular position. Cycling is effected by the control means so that successive blanks are machined by either machining means, depending upon whether they are rotated by the first shaft into the first or into the second angular position.

The present invention relates to a copying machine for machining the surfaces of blanks to be used as blades for water or steam turbines, turbo-jets, propellers, etc.

The present application is a continuation-in-part application based upon co-pending application Ser. No. 342,568, filed Feb. 4, 1964 and now abandoned.

It is known to machine such blanks by means of copying machines. In such machines, the tools used for machining the blanks are controlled by detecting means which, in turn, are controlled by a master pattern. It is also known to machine a blank simultaneously on both sides thereof to expedite the machining operation. The tools, which are generally milling or other cutting tools, are preferably so arranged that they work upon substantially opposite points of the blank to counteract the inherent resiliency of the blank.

After completion of the milling operation, which is inherently a rather coarse operation, the blank must be subjected to a second or finishing operation which is usually a grinding operation. This second operation is carried out in a special grinding machine. Accordingly, the complete machining of blanks of the general kind above referred to by methods and devices as heretofore known requires two separate operations. The two operations entail re-adjustment and reclamping of the blanks and must often be carried out at different locations and are thus correspondingly expensive and time-consuming.

It is an object of the invention to provide a novel and improved copying machine for machining blanks of the general kind above referred to with which blanks can be conveniently and accurately machined.

The copying machine of the invention generally provides for detachably mounting a pair of blanks to be machined for joint rotation about a rotational axis in circumferentially spaced relationship, preferably in diametrically opposite relationship, subjecting one of the mounted blanks to a first machining operation controlled by one of two master patterns and then rotating the machined blank through a predetermined angle for placing the second mounted blank in position for machining. The second blank is now subjected to the first machining operation controlled by a second master pattern and the first blank is subjected to a second machining operation while the second blank is subjected to the first machining operation. The blanks are then rotated again through said predetermined angle for placing the second blank in position for subjecting the same to the second machining operation. Both blanks are now finished. As it is evident, the first blank is finished when it is subjected to the second machining operation. It a third blank is to be machined, the first blank is removed after being finished, that is, upon completion of the second machining operation and the third blank is now mounted in the position previously occupied by the first blank. Accordingly, the third blank now becomes the second blank in the aforedescribed cycle and the blank which was initially the second blank in the cycle now becomes the first blank in the cycle with respect to the machining operations thereupon.

Other objects, features and advantages of the invention will be pointed out hereinafter and set forth in the accompanying claims constituting part of the application.

In the accompanying drawing, a preferred embodiment of the invention is shown by way of illustration and not by way of limitation.

In the drawing:

FIG. 4 is a diagram of the pipe system and the circuit system of the copying machine.

Figure 1:
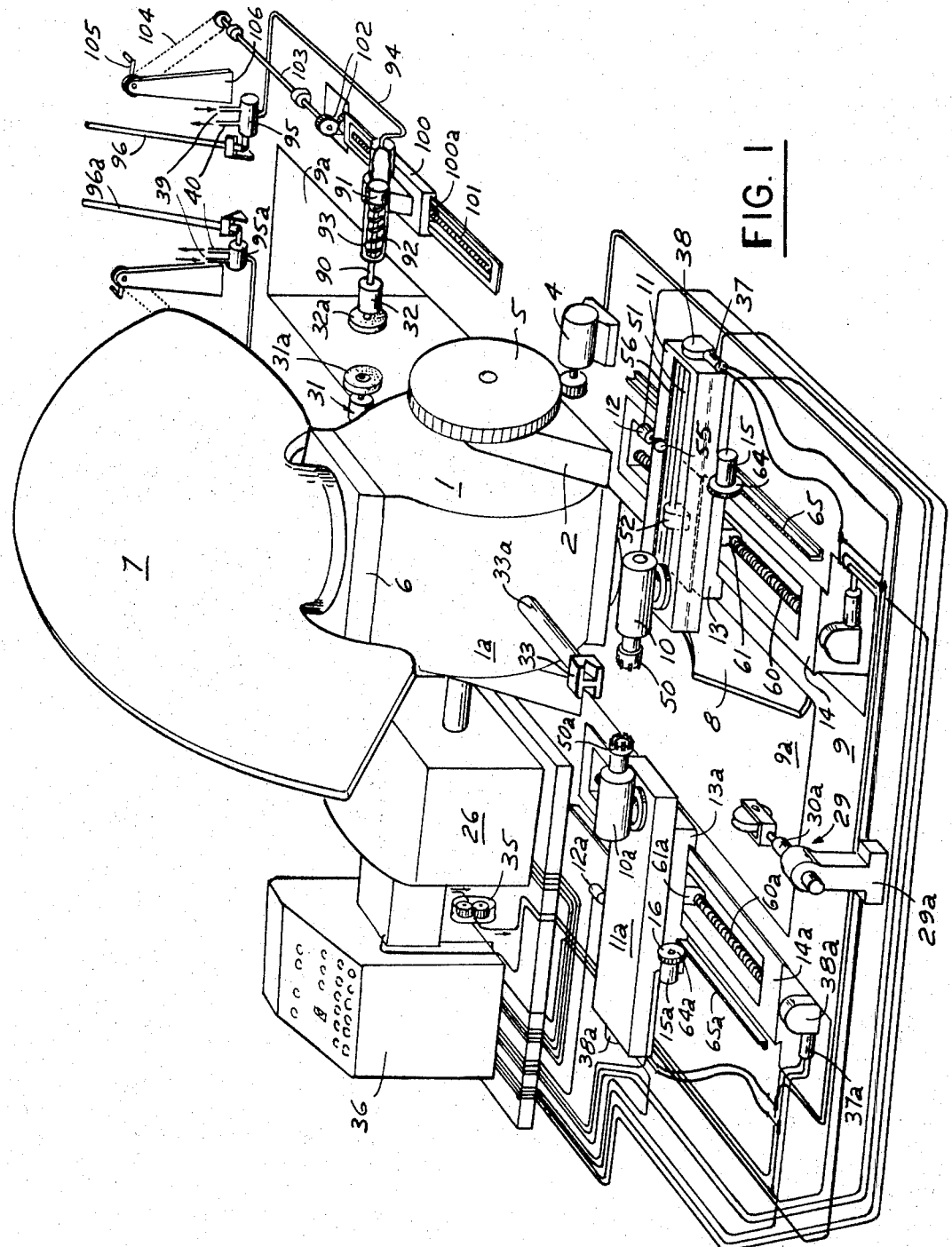
FIG. 1 is a perspective view of a copying machine according to the invention.

Referring now to the figures in detail, the copying machine comprises a mounting shaft 1 having an enlarged mounting hub 1a rotatably journalled in trunnions 2 and 3. The shaft is driven by a motor 4 via a gearing 5. The gearing is exemplified by a single gear, but in practice, the gearing may be more complex and preferably provides a variable ratio of transmission. The enlarged mounting hub 1a of shaft 1 mounts, preferably in diametrically opposite relationship, mounting means 6 and 6a, such as mounting brackets, for detachably securing thereto two blanks 7 and 8 to be machined. The blanks may be blanks suitable for machining therefrom blades for a Kaplan turbine. When the two mounting brackets are diametrically opposite, the blades of the blanks counterbalance each other during machining of the blades. The diametrical spacing of the brackets 6 and 6a is preferably such that the blanks, when mounted on the brackets, occupy the same position in reference to each other as they will occupy when they are installed on the turbine shaft after finishing.

The two trunnions 2 and 3 are suitably secured on a foundation 9, including a work pit 9a. The pit is so dimensioned that the two blanks, when mounted on brackets 6 and 6a, can be freely turned therein.

*First machining means of the copying machine*

The machine comprises a first machining means 10, 10a. The machining means 10 comprises a rotary cutting tool, such as a milling head 50. The head is mounted on a cross slide 11 which is displaceable on a slide 13 transversely of the general plane of blanks 7 and 8 mounted on brackets 6 and 6a. Displacement of the slide and with it of the tool are effected by means of a spindle 51 rotatable within a spindle socket 52. The spindle is driven by a suitable power drive means, such as a hydraulic motor 38, which is controlled by a pilot valve 37 as will become more fully apparent from the subsequent description. The position of displacement of slide 11 in reference to slide 13 is detected by a suitable detecting means, such as a synchro member 12 of a conventional follow-up system. The rotor shaft of the synchro member mounts a pinion 55, which is in engagement with a gear track 56 on slide 11 so that the angular positions of the shaft of synchro 12 are controlled by movements of slide 11.

The second slide 13 is displaceable on a base structure 14 substantially parallel to the general plane of blanks 7 and 8. Displacement of slide 13 is effected by a spindle 60 threaded through a spindle socket 61 on slide 13 and driven by a suitable power drive means, such as a second hydraulic motor 38 controlled by a pilot valve 37. As it is evident, displacement of slide 13 will move milling head 50 substantially radially of the blanks. The position of slide 13 and thus of milling head 50 in reference to the blanks is detected by a synchro member 15 of a follow-up system. The rotor shaft of this synchro member mounts a pinion 64 in mesh with a fixed gear track 65 so that the angular position of the rotor shaft is controlled by the lengthwise position of slide 13 in reference to the base structure 14.

The second first machining means 10a is arranged and displaceably mounted in the same manner as has been described for machining means 10. Accordingly, the same reference characters are used, but with the letter *a* affixed thereto.

To facilitate the setting of milling heads 50 and 50a at the beginning of a milling operation, a setting jig 33 may be provided which is secured to mounting hub 1a by a suitable fastening means such as a bracket 33a.

To prevent vibration of the blanks while being milled, a vibration damper 29 is preferably provided. The damper comprises a mount 29a suitably secured to the foundation 9 and supporting an elastic roller 30, such as a rubber roller having a concavely or tapered peripheral wall. An arm 30a supporting the roller is movable in mount 29a to move the roller into engagement with the peripheral rim of the blank to be milled at the beginning of a milling operation and to withdraw the roller from the blank upon completion of the milling operation.

*Copying assembly of the machine*

Figure 3:
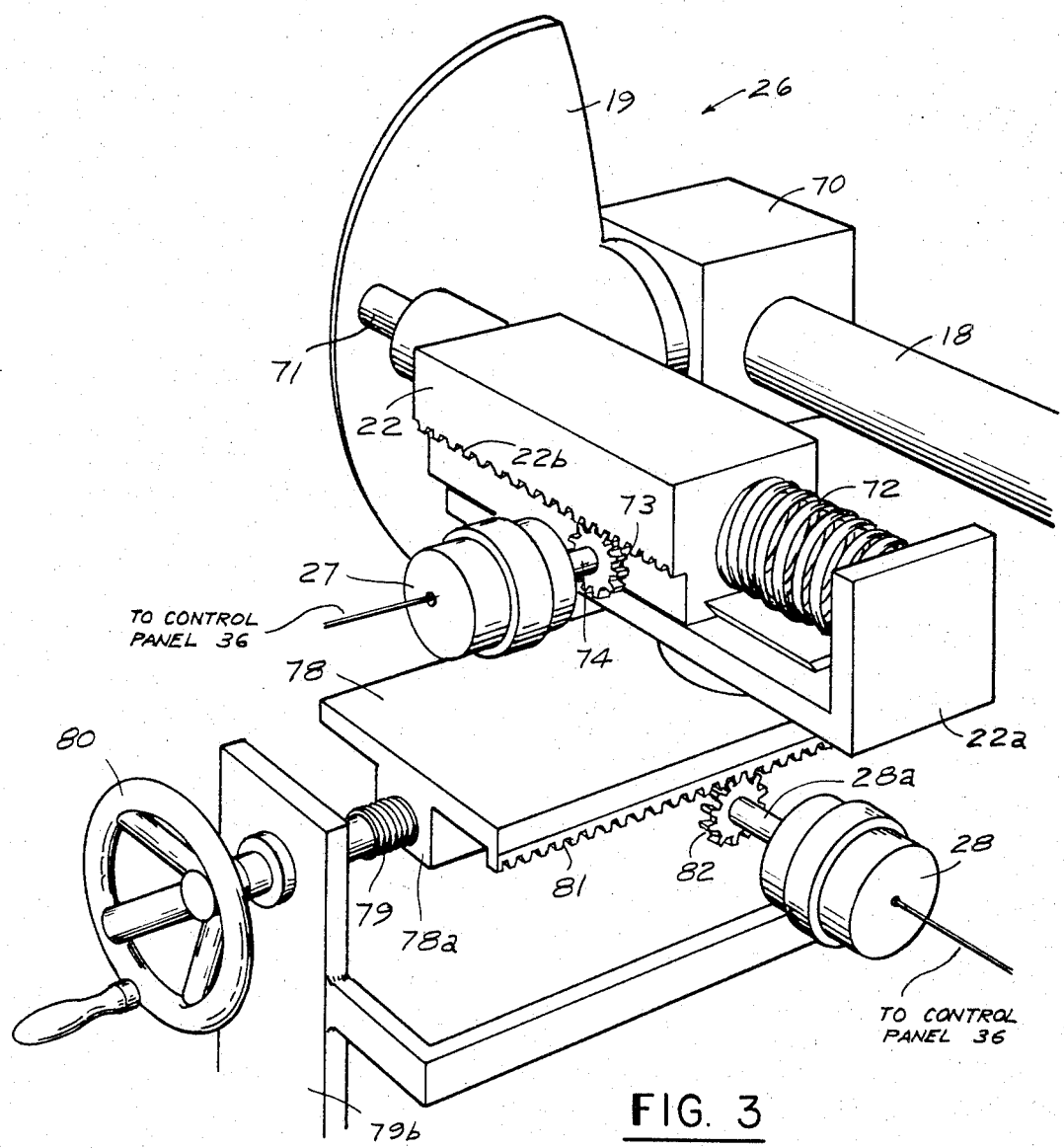
FIG. 3 is a perspective detail view of part of the copying control assembly of the machine on an enlarged scale.

The positioning of milling heads 50 and 50a as the milling operation progresses is controlled by a copying assembly generally designated by 26. This copying assembly, which is shown more in detail in FIG. 3, comprises a mounting means 70 which is seated on a shaft 18 for rotation in unison therewith. Shaft 18 should be visualized as being coupled to shaft 1 for rotation in unison therewith. Mounting means 70 has detachably mounted thereon two master patterns 19 and 20, the circumferential spacing of which corresponds to the circumferential spacing of blanks 7 and 8 on mountings 6 and 6a, respectively, that is, the master patterns are mounted diametrically opposite and in angular alignment with blanks 7 and 8. The master patterns, which may be visualized as being very small in comparison with the dimensions of the blanks, have configurations accurately corresponding to the desired final configurations of blanks 7 and 8. More specifically, pattern 19 is a master for blank 7 and pattern 20 a master for blank 8. The surface configurations, first of master 19 and then of master 20 on both sides of the masters, are continuously detected by probes or feelers 71 and 71a. To simplify the illustrations, FIG. 3 shows only the probe for the near side of the masters, but as it is diagrammatically indicated in FIG. 4, the same assembly is provided for detecting the configuration on the far side of the masters also. Probe 71 is supported by a bracket 22 which is slidably mounted on a cross slide 22a and urged by a directional force means, such as a spring 72, into continuous engagement with the surface of master 19 or master 20 as the case may be. The lengthwise position of bracket 22 on slide 22a controls the angular position of a synchro 27 which constitutes part of the follow-up system including synchro member 12 associated with and controlled by the lengthwise position of cross slide 11 on slide 13. For this purpose, bracket 22 has a gear track 22b which is engaged by a pinion 73 fixedly mounted on rotor shaft 74 of a synchro member 27. As it is evident, cross slide 22a of the copying assembly corresponds to cross slide 13 of the milling assembly 10.

The cross slide is mounted on a slide 78 which is lengthwise displaceable by means suitable for the purpose, such as a spindle 79, which is in threaded engagement with a boss 78a on slide 78 and is rotatably supported by a frame structure 79b. Rotation of the spindle, which may be conveniently effected by a hand wheel 80, moves probe 71 substantially radially of master 19 or master 20 as the case may be. The lengthwise position of slide 78 and with it the radial position of probe 71 in reference to master 19 is used to control the angular position of a synchro member 28 also supported by frame structure 79b. For this purpose, a gear track 81 on slide 78 is in engagement with a pinion fixedly mounted on rotor shaft 28a of synchro member 28. The synchro member is included in the follow-up of synchro member 15 of milling assembly 10.

As it is readily apparent from FIG. 4, the copying assembly for the opposite side of the master is arranged in the same manner as just described.

FIG. 4 also shows the pipe system for supplying the afore-referred to hydraulic motors with pressure fluid, such as oil, and the circuit system for operating the follow-up systems, the pilot valves 37 and 37a and motor 4. The oil in the pipe system is maintained under pressure by suitable pump means diagrammatically indicated by a pressure pump 35 of, for instance, the gear type.

All pipe lines and electric connections lead to or are connected with a central control panel 36. This panel, which is diagrammatically indicated in FIGS. 1, 2 and 4, should be visualized as being of conventional design. It enables the operator to start and stop the operations and to check whether the hydraulic pressure system and the electric system operate correctly. As it is readily apparent, the positions of probes 71 and 71a as controlled by the surface configurations on both sides of the respective master, will control the milling action of heads 50 and 50a by correspondingly operating hydraulic motors 38 via valves 37. The control signals generated by the synchro members in the follow-up systems will continuously adjust the positions of the components controlled by the same. Control systems of this kind are well understood in the art and do not constitute part of the present application as such. The radial positions of milling heads 50 and 50a are controlled by operating hand wheels 80 and 80a which, in turn, displace probes 71 and 71a in reference to masters 19 and 20.

Second machining means

As stated before, the first machining means, being milling tools, leave a comparatively rough surface on the blanks and the purpose of the second machining means is to finish the machining of the blanks. Suitable finishing tools are grinding tools idicated at 31 and 32. These grinding tools have grinding discs 31a and 32a, respectively, disposed for simultaneous grinding on opposite surface areas of a blank to avoid vibration of the blank while being ground. The control of the grinding tools is shown as a manual control, but it should be understood that it is possible and within the scope of the invention to control the operation of the grinding tools by a copying assembly similar to the one shown for the control of the milling tools.

Grinding disc 32a is mounted on a rod 90 mounting a piston 91. This piston is slidable in a cylinder 92 and is urged by a coil spring 93 into a position in which grinding disc 32a is withdrawn from a blank. The cylinder space opposite to spring 93 is connected to a pressure line 94 leading to a control valve 95 (see FIG. 4). The valve is connected to an inlet 39 for a pressure medium and an outlet 40 for the pressure medium, such as pressurized air. As it is readily apparent from FIG. 4, the pressurized air acting upon piston 91 against the action of spring 93 can be readily controlled by a pivotally mounted and a manually operable handle 96 for moving grinding disc 32a with the desired pressure against a blank. The discs are shown in FIG. 4 in the grinding position, that is, valve 95 is set for supplying air through inlet 39.

The radial position of the grinding tool in reference to a blank to be ground is controlled by means of a slide 100, which is displaceable on foundation 9 by a spindle 101 threaded through a boss 100a extending from slide 100. The spindle may be rotated by a gearing 102 coupled to a shaft 103 which may be driven by any suitable means indicated by a chain drive 104 and a handle 105 rotatably mounted on a support 106.

Operation of the copying machine

The machine as hereinbefore described functions as follows:

Let it be assumed that two blanks 7 and 8 are to be machined and that they are in the angular positions of FIG. 1. Let it further be assumed that appropriate master patterns 19 and 20 are mounted on mount 70, that the probes 71 and 71a are appropriately set and that the power is turned on for the entire installation by means of control panel 36. Let it finally be assumed that the milling heads 50 and 50a are set against the setting jig 33. Shaft 1 is now turned so that blank 7 will pass between the two milling heads whereby the blank is continuously milled under the control of master 19 as previously described. The finishing or grinding tools 31 and 32 remain idle during the first machining operation of blank 7.

After shaft 1 has turned through a predetermined first angle, to wit, an angle of 180° in the exemplified machine, the milling of blank 7 on both sides thereof is completed. The blank is moved out of the reach of the milling heads and into the reach of grinding discs 31a and 32a. The second blank 8 enters the reach of the milling heads and is now being milled as the rotation of shaft 1 proceeds. While the second blank (blank 8) is being milled, the first blank (blank 7) is subjected to the second machining operation, to wit, the finishing operation by the grinding discs 31a and 32a.

Figure 2:
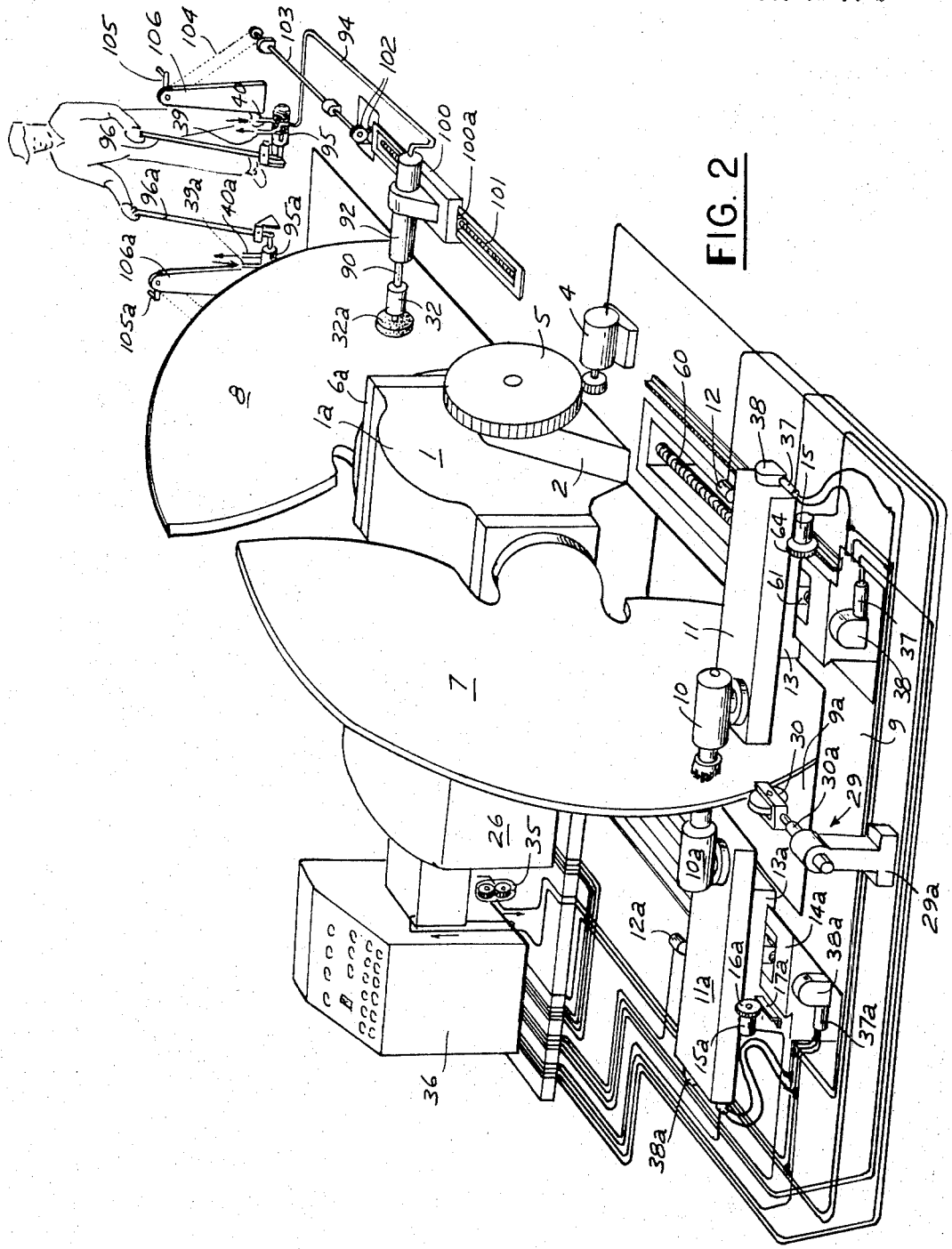
FIG. 2 is a perspective view similar to FIG. 1, but showing the copying machine in a different operational position.

FIG. 2 shows the position of the blanks in which blank 7 is within the reach of the milling tools and is milled by the same and the blank 8 is within the reach of the grinding tools which are not operated as yet.

When shaft 1 has turned through a second predetermined angle which is again an angle of 180°, the first blank has returned into the position of FIG. 1. During this second turning of the shaft, the grinding tools are operated and blank 7 is ground. The machining of blank 7 is now finished and the blank can be replaced by a new raw blank to be machined. The second blank 8 has been milled during the second turning of the shaft and is now ready for finishing by grinding. The grinding of the second blank is effected when and while the newly mounted blank is being milled. In other words, during each full turn of the shaft, one blank is milled and the other is ground, except during the first half turn after starting of the machine when one blank is milled and the other is not machined. The aforedescribed cycle is continuously repeated as long as new blanks are mounted on mounting brackets 6 and 6a.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A copying machine for machining blanks in continuous operation in conformity with master patterns, said copying machine comprising, in combination, a rotatable shaft, a pair of blank mounting means secured to said shaft in circumferentially spaced relationship for joint rotation with said shaft, said blank mounting means being arranged to mount detachably thereon a pair of blanks to be machined, a first machining means for machining blanks mounted on said blank mounting means in a first predetermined angular position of the blank mounting means, second machining means positioned to machine one mounted blank when the respective blank mounting means is in a second predetermined angular position and the other mounted blank when the respective blank mounting means is in a second predetermined angular position, a pattern mounting means for mounting a pair of master patterns, drive means for unidirectionally rotating said blank mounting means from said first angular position into said second angular position and from said second angular position into said first angular position, said pattern mounting means including a rotatable pattern shaft coupled with the shaft for said blank mounting means for rotation in unison with said latter shaft, said pattern mounting means being mounted on the pattern shaft in circumferentially spaced relationship, each of said pattern mounting means being disposed in angular alignment with the respective blank mounting means, turning of the shaft mounting the blank mounting means by said drive means into said predetermined angular positions turning the shaft mounting the pattern mounting means into corresponding angular positions, and control means controllable by either one of the master patterns when mounted on said pattern mounting means, said control means when controlled by one of said master patterns controlling said first machining means to machine a mounted blank in said first predetermined angular position of the blank mounting means and when controlled by the second master pattern controlling said second machining means to machine a mounted blank in said second predetermined angular position of the blank mounting means.

2. A copying machine according to claim 1 and comprising actuating means for selectively moving said second machining means into and out of machining engagement with the respective blank.

3. A copying machine according to claim 2, wherein said first and said second machining means each comprise tool means for simultaneously machining several surface portions of said mounted blanks.

4. A copying machine according to claim 3, wherein said tool means are disposed in alignment on opposite sides of the blank mounting means.

5. A copying machine according to claim 1, wherein said control means comprise detecting means coacting with said master patterns to detect the surface configurations thereof and to generate control signals corresponding to the detected surface configurations, and drive means for said machining means controlled by said signals for machining the blanks in accordance with the surface configurations of the master patterns.

References Cited

UNITED STATES PATENTS

| | | | |
|---|---|---|---|
| 1,825,455 | 9/1931 | Hawes | 51—100 |
| 1,933,798 | 11/1933 | Gebers | 90—13 |
| 2,111,271 | 3/1938 | Nenninger | 51—100 |
| 2,151,743 | 3/1939 | Chladek | 90—13.5 |
| 2,166,859 | 7/1939 | Carlson | 51—108 |
| 2,303,529 | 12/1942 | Eby | 51—100 |
| 2,397,108 | 3/1946 | Hanna et al. | 90—13.7 |
| 2,597,180 | 5/1952 | Reaser et al. | 51—101 |
| 2,964,885 | 12/1960 | Jalbert | 51—101 |

FOREIGN PATENTS 635,963  4/1950  Great Britain.

GERALD A. DOST, *Primary Examiner.*